UNITED STATES PATENT OFFICE.

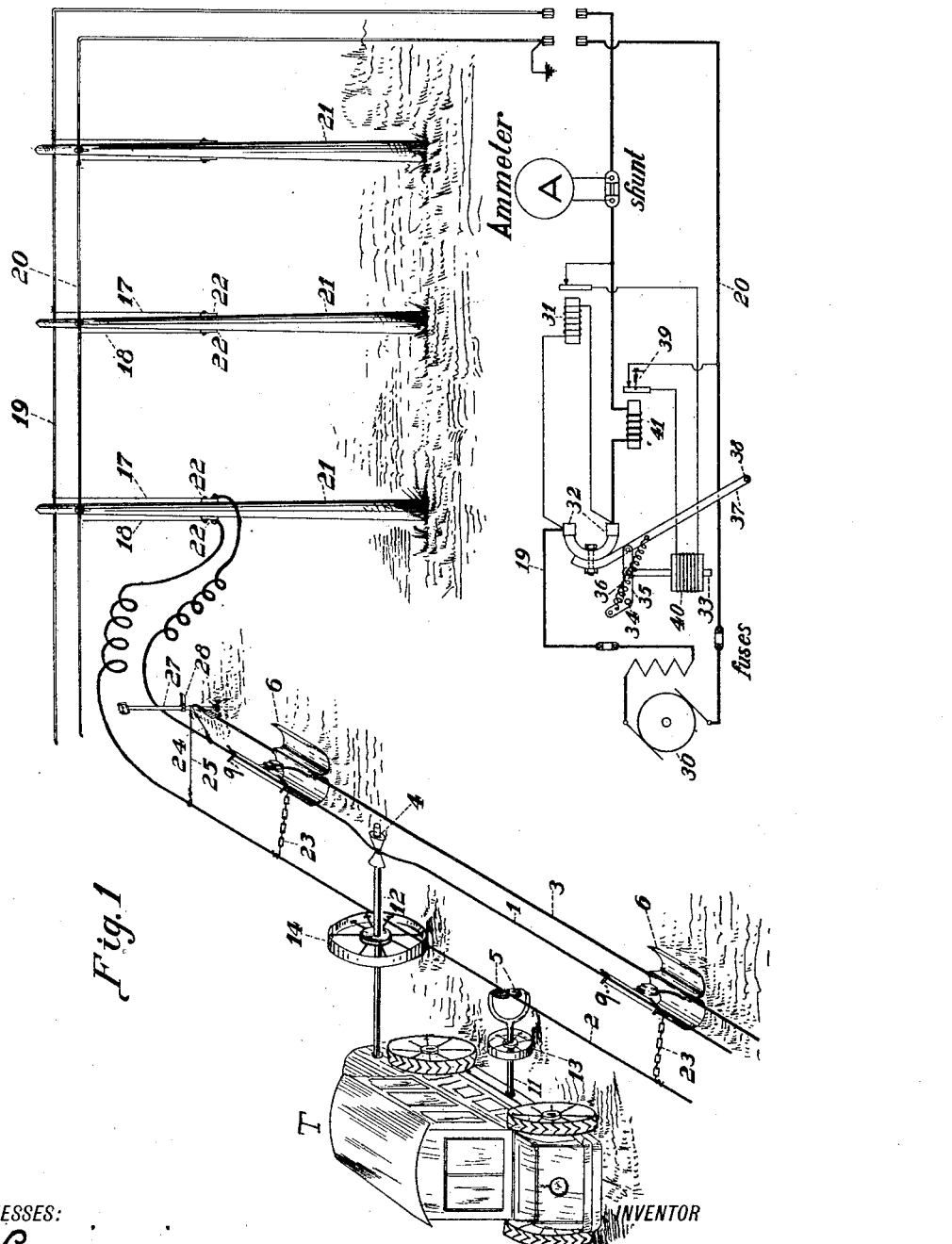

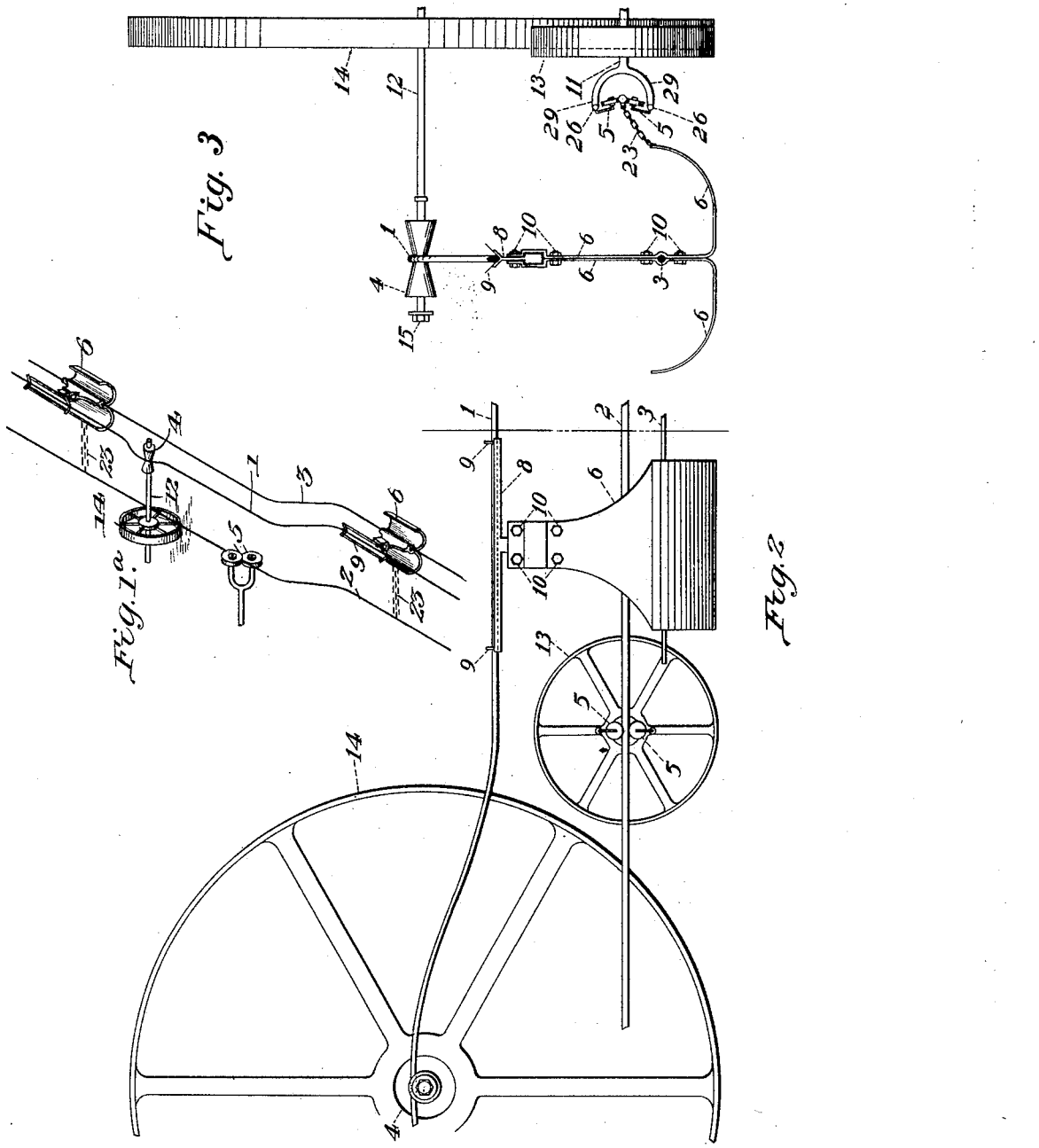

EUGENE W. SANDERSON, OF NEW YORK, N. Y.

AGRICULTURAL TROLLEY SYSTEM.

1,107,228.  Specification of Letters Patent.  Patented Aug. 11, 1914.

Application filed June 9, 1913. Serial No. 772,563.

*To all whom it may concern:*

Be it known that I, EUGENE W. SANDERSON, a citizen of the United States of America, and resident of New York, in the county of New York and State of New York, have invented certain new and useful Improvements in Agricultural Trolley Systems, of which the following is a specification.

My invention relates to means for feeding an electric current to motor cultivators or tractors which are intended to run back and forth over different portions of a plot of land in succession.

The object of the invention is to feed an electric current to tractors without planting poles across the field in rows, and without causing delays in moving the feeders to new positions to accommodate the tractor which takes a new path on each trip.

Figure 1 is a view partly in diagram and perspective of the general organization and circuits, showing the tractor making its first trip across the field. Fig. 1ª is a representation of a portion of Fig. 1 to indicate the bending of the feeders during subsequent trips of the tractor across the field. Fig. 2 is a side elevation of a part of the tractor feeders and some adjuncts on a larger scale than in Fig. 1. Fig. 3 is a front elevation of Fig. 2.

Like reference characters in different figures refer to like parts.

My invention is illustrated by providing a local electrical generator 30 at some convenient position on the farm where it can serve also for other sundry purposes.

From the generator 30 the conductors 19 and 20, of which conductor 20 is the grounded lead, are run and supported on poles 21 which are located along one side of a field. To the leads 19 and 20 are attached leads 17 and 18 respectively, which are connected to the terminal blocks 22 on the left hand pole 21, and also on the other poles 21. In Fig. 1 are indicated the feeder wires 1 and 2 attached to the terminal block on the left hand pole 21. The wire 1 is connected thereby to the lead 17, and the wire 2 to the lead 18.

There are shoes 6 located on the ground at intervals in a row across the field and are designed to slide sidewise over the field. The feeder wire 2 is mechanically connected to the shoes 6 by short chains 23. The shoes are also connected to each other by an iron cable 3, which is stretched tight and fastened at the ends to stakes, one of which is shown at 27. The stake may be pushed into the ground by the pedal 28. The wire 1 is fastened to the stake 27 by an insulated connector 24. The conductor 2 is connected to the stake 27 by a wire 25. A trolley wheel 4 is provided for conducting the current from the wire 1 to the tractor T through the axle 12, held level by the tractor extra wheel 14. The return conductor is the axle 11 on the tractor and extending laterally therefrom and having a supporting wheel 13 which like the wheel 14 rolls on the ground as the tractor travels. The contact is made with the wire 2 by means of trolley wheels 5 which are carried by the axle 11, thereby completing the circuit through the tractor. The two trolley wheels are pivoted at 26 by pivot supports which are at the end of the arms 29 on the axle 11. The shoes themselves are constructed of two bent iron sheets, attached together by bolts 10. A V-shaped support 8 and 9 is on top of each shoe and in these supports lie the conductor 1, so that the trolley wheel 4 can run on the under side and pass the shoes by raising the wire 1.

I do not describe the nature and operation of the apparatus at the local generating plant except to say that the generator is indicated at 30.

The operation is as follows: When the tractor travels back and forth it pulls the shoes and its connections laterally, except on the first trip across as illustrated in Fig. 1. When the tractor makes its second trip, it takes a new path parallel to its first path but farther to the left and as it pulls the wire 2 laterally the shoes and wire 1 are also moved over to a new position without any delay.

I claim as my invention:—

1. In an electric trolley system, the combination of sliding shoes each consisting of two curved and bent iron sheets for resting upon the ground and fastened together, a cable connecting said shoes together, feeders, chains connecting one of said feeders at intervals to each of said shoes, a tractor electrically connected to said feeders, V-shaped supports on top of the shoes for holding one of said feeders, a trolley wheel for running against one of said feeders, a pair of trolley wheels grasping the other feeder for pulling the feeders and shoes laterally as the tractor travels along.

2. In an electric trolley system, the combination of sliding shoes, a cable connecting them mechanically together, a feeder, flexible connectors on said shoes and attached to said feeder, V-shaped supports on each shoe, a second feeder extending from shoe to shoe and lying in said V-shaped supports, a trolley wheel for running along the under side of said second feeder for collecting current, and other trolley wheels running along and grasping the first feeder.

3. In a trolley system, the combination of feeders extending across a field, a tractor for running back and forth along the feeders, sliding shoes supporting one feeder, chains connecting the second feeder to said shoes, and trolley wheels attached to said tractor and grasping said second feeder for pulling the shoes and feeders laterally.

4. In a trolley system, the combination of sliding shoes, a feeder wire carried thereby, a cable mechanically connecting said shoes together, a second feeder wire, chains connecting said second feeder wire to said shoes, and a pair of trolleys running along said second feeder and grasping the same for pulling laterally said shoes and the first named feeder wire.

Signed at New York city in the county of New York and State of New York this 5th day of June A. D. 1913.

EUGENE W. SANDERSON.

Witnesses:
W. E. BENJAMIN,
C. H. BOVELL.

---

Copies of this patent may be obtained for five cents each, by addressing the "Commissioner of Patents, Washington, D. C."